United States Patent Office 3,507,626
Patented Apr. 21, 1970

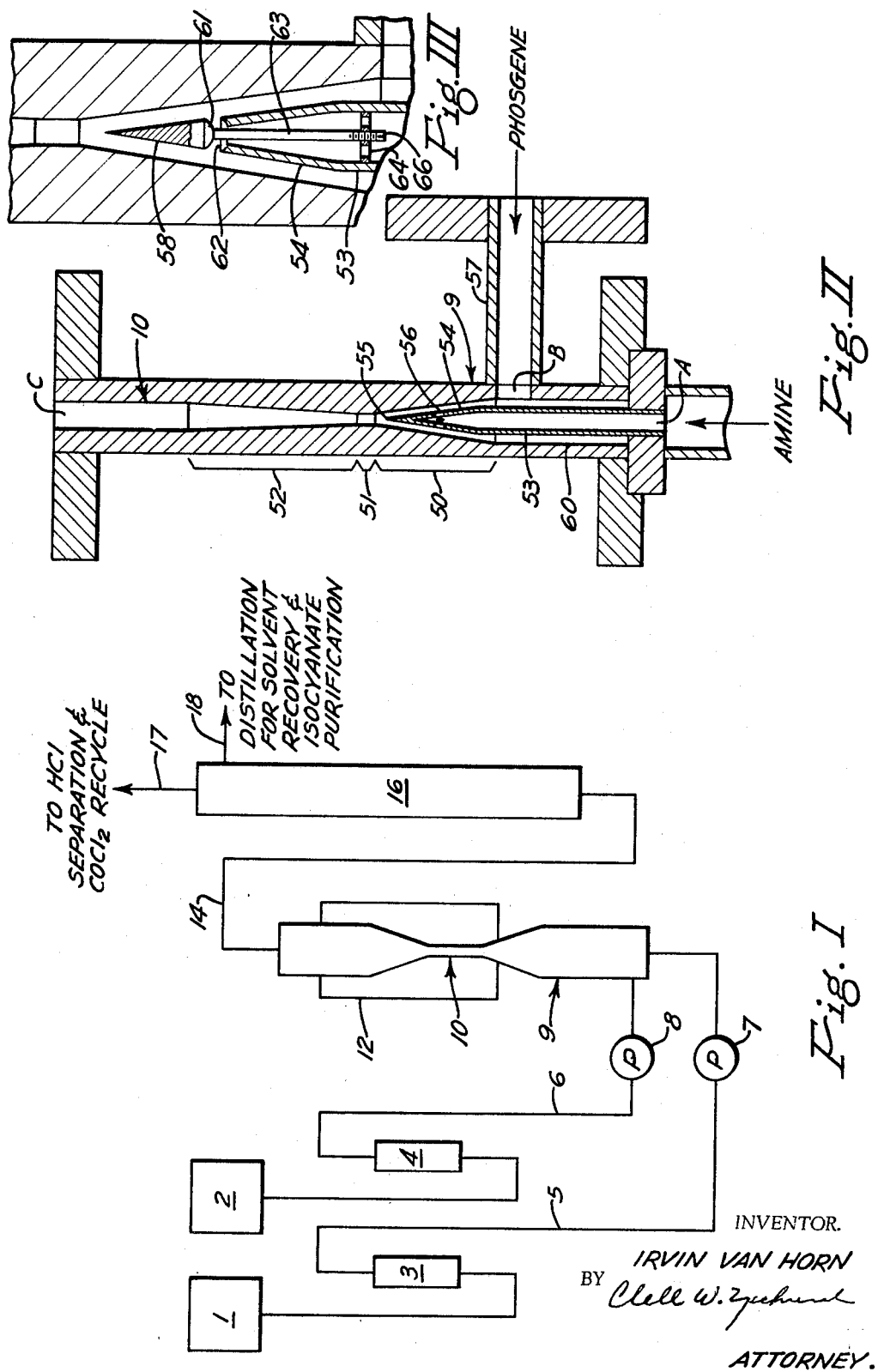

3,507,626
VENTURI MIXER
Irvin B. Van Horn, New Martinsville, W. Va., assignor to Mobay Chemical Company, Pittsburgh, Pa., a corporation of Delaware
Filed Oct. 15, 1965, Ser. No. 496,386
Int. Cl. B01f 5/18
U.S. Cl. 23—284                                5 Claims

ABSTRACT OF THE DISCLOSURE

A venturi mixer especially adapted for mixing phosgene with amine to produce an isocyanate having a first conduit with a first inlet, second inlet and an outlet. The first conduit has a venturi section formed by a converging section, a throat section and a diverging section. A second conduit is coaxially disposed within the first conduit as the first inlet. The second conduit has a tapered section that concurs with the converging section of the venturi section and terminates in a dispersing means for transversely dispersing fluid therefrom into the surrounding chamber section of the venturi section. The mixer insures mixing and prevents plugging due to the formation of side reaction products.

---

This invention relates to the preparation of isocyanates, and more particularly to an improved apparatus and method for the production of isocyanates.

The reaction between amines and phosgene lends itself to the commercial preparation of isocyanates. As commercially practiced, the method for preparing isocyanates usually involves two steps. In the first step an amine solution is mixed with a phosgene solution at a low or moderate temperature to form a carbamoyl chloride slurry. This slurry is then treated with more phosgene at a temperature sufficient to complete the reaction to form the isocyanate.

The reaction for the formation of an isocyanate from phosgene and an amine is:

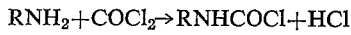
$$RNH_2 + COCl_2 \rightarrow RNHCOCl + HCl$$

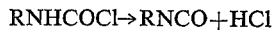
$$RNHCOCl \rightarrow RNCO + HCl$$

It is at once apparent that a number of side reactions are possible which result in the formation of amine hydrochlorides, ureas, biurets, and so on. In order to avoid these side reaction products in either the two step process, or, more especially, in a one step process, an excess of phosgene must be used so that the amine can be completely surrounded with it.

It has been proposed that isocyanate yields can be increased, and that methods for the preparation of isocyanates can be readily simplified with the use of an apparatus such as that disclosed in Belgian Patent 546,003. The device described is a convergent-divergent apparatus in which pure or dissolved phosgene (in an organic solvent) and pure amine in a free state or in the form of an easily decomposable salt are injected by means of pumps or compressors into a reaction chamber where mixing is supposed to take place by the proper movement of the injected materials or by the additional forces of electro-magnetic or ultrasonic devices. The phosgene is pumped into the mixing chamber at a right angle to a conduit through which the amine is pumped, or vice versa, as desired. The two materials are intimately mixed in the collar of the convergent-divergent apparatus and leave the apparatus by means of a conduit to a reaction tube. Although this expedient is alleged to give better yields with a minimum of difficulty, in actual operation, the device proved to be commercially unfeasible because it did not permit the amine to be completely enveloped in or with the phosgene. This deficiency is due to the manner in which the reactants are introduced.

When phosgene is sprayed through a nozzle into the collar of the convergent-divergent device of the Belgian patent and the amine is introduced from the side of the nozzle at approximately right angles to the phosgene nozzle, the pumping force required to accomplish any kind of effective mixing causes a large quantity of phosgene to be sprayed through the throat of the apparatus without contacting the amine which is being introduced from the side. Consequently, the unmixed amine at the wall of the device forms side reaction products with the main amine-phosgene reaction products (carbamoyl chlorides) which are formed in or near the phosgene spray. The side reaction products are very sticky substances which will agglomerate and plug up any passageways or encrust any surface with which they come into contact. Therefore, the side reaction products build up around the area where the reactants are introduced, plugging it up and rendering the apparatus useless until it can be dismantled and cleaned. In addition, if the amine is sprayed through the nozzle and the phosgene is introduced from the side of the chamber, some of the amine shoots through the throat reacting with phosgenation products and causing pluggage further down in the apparatus. Thus, the yields of isocyanate are greatly reduced and the difficulty and expense of maintaining the equipment is prohibitive.

It is therefore an object of this invention to provide a method and improved apparatus for the preparation of isocyanates which is devoid of the foregoing disadvantages.

Still another object of this invention is to provide a means for the manufacture of isocyanates which will allow for an improved yield, ease of operation and a minimum of expense.

Still another object of this invention is to provide an apparatus in which isocyanates can be made which will not become plugged up due to the formation of side reaction products and which is ideal for pressure type phosgenations.

Yet another object of this invention is to provide an apparatus having no moving parts in which complete and intimate mixing of the reactants can take place and which requires a minimum of maintenance while allowing a maximum of safety and ease of operation.

A further object of this invention is to provide an improved device for the preparation of isocyanates which will permit separate mixing and reaction zones.

Other objects will become apparent from the following description taken in conjunction with the accompanying drawings throughout which like reference characters indicate like parts, and in which FIGURE I is a schematic drawing of a manufacturing system for the production of isocyanate;

FIGURE II is a detailed horizontal cross-section of the mixing chamber; and

FIGURE III is a horizontal cross-section of a modification of the improvement of this invention.

According to this invention, the foregoing objects and others are achieved by a first conduit having two inlets and an outlet and a venturi section therein, which venturi section has a converging section, a throat, and a diverging section. Within the first conduit, the first inlet includes a second conduit coaxially disposed within the first conduit having a smaller diameter than the first conduit and having a tapered section that concurs with the converging section of the venturi, which tapered section terminates in a means for dispersing fluid therefrom into the surrounding chamber as a spray. The second inlet is the means through which one of the reactants is introduced through a third conduit. The external surfaces of the second conduit and the internal surface of the first conduit have a mirror finish. Thus, since the mixing of the phosgene with the amine takes place in the converging section of the venturi and the reaction between the phosgene and the amine takes place downstream of the throat of the venturi section, the mixing of the amine with the phosgene and the reaction between the phosgene and the amine takes place in separate reaction zones. The method involved in the operation of the invention involves introducing an excess of phosgene over that required to react stoichiometrically with an amine under pressure into the attenuated mixing zone defined by the converging section of the venturi device and introducing an amine in a direction transverse to the direction of flow of phosgene and under a pressure greater than the pressure in the attenuated mixing zone, and immediately passing the mixed reactants from the attenuated mixing zone into a diverging reaction zone.

Some of the greatest advantages of his apparatus reside in the fact that it has no moving parts and therefore, the maintenance required is negligible. There is a high safety factor since the system is closed with no shaft seals and the like to fail. The apparatus is designed so that any phase of reaction may be controlled to a precise temperature if desired and makes possible the execution of high pressure reactions. Further, the venturi design will give supersonic flow to the reactants for extremely rapid and thorough mixing. In addition, the apparatus may be used as a general all purpose mixing apparatus suitable for carrying out oxidations, chlorinations, sulfonations, nitrations, alkylations and the like reactions.

With reference to the phosgenation reaction in particular, it should be noted that the above-defined improvement may be used in any type of system for the preparation of an isocyanate from the reaction between phosgene and an amine. For example, the system depicted in FIGURE I may be used as an example of one type of suitable system in which the improvement of this invention may be incorporated. In FIGURE I, 1 and 2 designate reservoirs from which the amine and the phosgene are fed into the system through conduits 5 and 6 respectively. The conduits 5 and 6 have rotameters 3 and 4 by means of which the desired proportions of the reactants are selected to be pumped into the chamber 9 by means of injection pumps 7 and 8. (Chamber 9 is hereinafter described in detail in description of FIGURE II.) The reaction tube 10 may be heated or cooled by means of a right tube with double casing 12 or by any other suitable means such as a heating or cooling coil. The reaction product is discharged by way of conduit 14 to a hot phosgenation tower 16 where the reaction may be completed if it has not been completed in the reactor. Excess phosgene and by product HCl are vented through conduit 17 to an absorber where phosgene is recovered fro recycle. The product isocyanate is discharged through conduit 18 to a distillation unit for solvent recovery and isocyanate purification.

In FIGURE II, the chamber and reaction tube, 9 and 10, are shown in cross-sectional detail. The conduit 60 has two inlets, A and B, and an outlet C. The conduit 60 has a venturi section in it which comprises a converging section 50, a throat section 51, and a diverging section 52. Coaxially disposed within the conduit 60 is a second conduit 53 which has a tapered section 54 which concurs with the converging section of the venturi section, and which terminates in a point 55. The tapered section of the conduit 53 has a plurality of holes or openings in it, 56. The second inlet B of the conduit 60 comprises a third conduit 57, and the opposite end of the conduit 60 from the inlet A is the outlet C. The internal walls of the conduit 60, and the external surfaces of the conduit 53, as well as the throat 51 and divergent section 52, have a mirror finish which, in combination with the conical end of the conduit 53 results in the rapid and complete mixing of the reactants without any substantial amount of reaction taking place in the converging section of the venturi section. This expedient also permits reaction to take place in such a manner that the reaction products formed can not adhere to the inside walls and surfaces of the mixing apparatus. As a consequence, the intimate and complete mixing of the phosgene and the amine can take place in one chamber, while the reaction itself takes place in another chamber of the venturi device with no possibility of plugging up the apparatus.

Preferably, the improvement of this invention is operated in the following manner. Amine is introduced into the system by means of the conduit 53 having a tapered, closed-off end with a series of openings or holes in the tapered portion of the conduit. The openings are located in the tapered portion of the conduit to insure the most efficient mixing in the converging portion of the venturi section without chemical reaction also taking place in the converging section of the venturi section. Further, the amine is pumped through the conduit at a velocity of from about 5 feet per second to about 20 feet per second or even higher, and even as high as 50 feet per second. Preferably, the velocity should be from about 10 to about 20 feet per second and the phosgene is pumped in at a rate sufficient to insure an excess thereof over the amine depending on the rate of introduction of the amine.

The minimum number of apertures in the tapered portion of the conduit 53 is three but the maximum number of openings is limited only by the strength of the equipment and the capacity of the unit; that is, the greater the capacity of the unit, the more holes will be accommodated. It should be kept in mind, however, that a large number of holes drilled close together will weaken the cap on the end of the conduit and, under high pressure, may cause the end of the conduit to be blown off. It is also to be noted that the holes may have any configuration which will permit immediate dispersion of the amine.

The disposition of the holes is preferably in a straight line around the conduit in a plane perpendicular to the length of the conduit, and at an angle with respect to a plane drawn through the center of the openings which will allow the emission of the amine to be perpendicular to the inner walls of the converging section of the venturi rather than straight out against the walls. The angle of the holes, therefore, should preferably allow for an emission of amine at about half of a 45° angle with respect to a plane passed through the center of the openings. Should it be so desired, the holes may be drilled to permit the emission of the amine at an angle other than 90° with respect to the walls of the converging section of the venturi section, the angle being preferably between about 0° and about 45° with respect to a plane passed through the center of the openings. Any backsplashing which occurs when the angle is adjusted can be insured against simply by keeping the coaxial space between 54 and 60 as small as possible. Alternatively, the openings may be arranged in some other manner or in a random configuration as suits the process being carried out and the equipment at hand. In such an instance, specifications for the angle at which the hole is drilled with respect to a plane drawn through the center of the hole and perpendicular to the length of the conduit remain the same as stated hereinbefore for holes drawn in a straight line around the conduit.

The size of each of the openings in the conduit should preferably be about $\frac{1}{16}$ of an inch in diameter, but may be any diameter which will permit the reactants to be introduced to one another at the linear velocity required for rapid and efficient mixing.

In a modification of the apparatus as shown in FIGURE III, it is possible to use a conduit 53 facing a streamlined conical baffle 58 in lieu of the holes drilled in the conduit to accomplish the same purpose. However, caution must be exercised since good results cannot be obtained using a baffle, even if it had a streamlined conical shape unless the baffle has a convex base 61 facing the opening of the conduit which has a concave mouth 62 to complement the base of the baffle. By concave mouth is meant that the end of the conduit is circular with the inner wall of the conduit being recessed with reference to the outer wall. Further, if a baffle is used, the space between the baffle and the conduit is restricted, depending on the size of the unit, so that effective mixing can be achieved. Therefore, if the opening is too great the amine will flow rather than spray out and inefficient mixing with a great deal of backsplashing results while, if the opening between the baffle and the conduit is too small, plugging tends to occur. The proper spacing between the baffle and the conduit must be determined for each unit according to its size and capacity.

The baffle can be secured in position by any suitable means; however, it is within the contemplation of this invention that the baffle 58 be secured by means of a rod 63 passed through the center of the conduit 53 and anchored at one end to the center of the baffle. The other end of the rod is threaded 66 and secured to the inside of the conduit by a spider 64 anchored to the inside surface of the conduit, the center of which holds the rod in threaded relationship thereto. Thus, the opening between the baffle and the mouth of the conduit may be easily adjusted simply by screwing the rod further into or out of the threaded member in the center of the amine conduit. In accordance with this invention, the baffle will have a mirror finish on its entire surface.

The essence of the present inventive concept requires that it is the amine which is pumped through the conduit and not the phosgene. This requirement ensures that there is always an excess of phosgene to surround the amine as it enters the mixing chamber so that no side reaction products can form in the mixing chamber to encrust the walls of the mixing chamber or plug up the passageways. If the phosgene were pumped through the conduit 53, as the amine entered the system behind it, some of the amine would not be enveloped in phosgene during the mixing operation and reaction products would form which would plug the apparatus thus resulting in a recurrence of the prior art problems.

The phosgene is therefore channelled into the mixing chamber through the conduit 57 which is preferably located adjacent to and immediately preceding the converging portion of the venturi section. Although this location for the entrance of the phosgene allows for superior mixing in accomplishing the objects of this invention, the phosgene may also be introduced either above or below this point as suits the requirements of the process and the equipment at hand.

The inner walls of the conduit 60 and the exterior of the conduit 53 have a mirror finish while the end of the conduit 53 comes to a point. These expediencies cooperate to prevent the build-up of carbamoyl chlorides and undesirable materials on the inner walls of the venturi section and thus prevent pluggage of the venturi throat by a build-up on the end of the conduit or baffle. As the mixed reactants speed out of the mixing chamber and through the throat, there is nothing in the apparatus to impede their progress and thus cause reaction to take place in the mixing zone or to cause a build-up of materials which would eventually plug up the apparatus. If a conventional plug were used to close off the end of the conduit, or a conventional baffle which generally has a round shape is used, as the reactants are propelled out of the mixing chamber and through the throat, currents would tend to cause a build-up of the materials in the areas where the passage of the reactants is not so vigorous, for example, on the side of the baffle or plug opposite the mouth of the conduit, and this would eventually result in complete plugging of the apparatus. In the meantime, the progress of the reactants would be slowed down and yield losses would increase. It is also to be noted here that the terminus of the conduit which comes to a point may either be a solid plug or it may simply be the result of drawing the end of the conduit to a point thereby making it hollow; either modification is effective in the practice of this process.

The amine and phosgene may be introduced to one another in the apparatus of this invention either in solution form or directly, without the use of a solvent or suspension agent. If a solvent is employed, any suitable solvent or suspension agent may be used in the primary phosgeneration step of the method of this invention, such as, for example, benzene, toluene, xylene, chlorobenzene, dichlorobenzene, tetrahydronaphthalene, chlorotoluenes, chlorinated aromatic hydrocarbons, including chlorinated biphenyls, nitrobenzene, cyclohexane, kerosene, benzine, carbontetrachloride, tetrachlorethylene, trichlorethylene, amylbenzene, o-, m-, and p-cymenes, dodecylbenzene, naphthalene, heptylcyclopentane, diphenyl, heptane, dioxane, dibutylether, diisobutyl ketone, and the like. The concentration of the amine in the chosen solvent depends on the starting materials used. The concentration of the phosgene in the solvent chosen also depends on the starting materials used. However, it is preferred that the concentration of the organic amine in the solvent be from about 3% to about 30% and the concentration of the phosgene in the solvent from about 5% to about 50%.

Any and all isocyanates and polyisocyanates can be prepared easily and efficiently in the apparatus of this invention, the most important of which are toluylene diisocyanate and the isomers thereof, 4,4'-diphenylmethane diisocyanate, and polyaryl polyalkylene polyisocyanates which may be represented by the formula

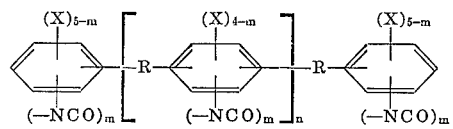

in which R is an organic radical and preferably an aliphatic radical obtained by removing the carbonyl oxygen from an aldehyde or ketone and is preferably —CH$_2$—, m is 1 or 2, X is halogen, lower alkyl or hydrogen and n is 0, 1, 2 or 3. The aliphatic radical, R, in the foregoing formula may be obtained by removing the carbonyl oxygen from any suitable aldehyde or ketone such as, for example, formaldehyde, acetaldehyde, propionaldehyde, butyraldehyde, n-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is a methylene radical or from acetone, CH$_3$—CO—CH$_3$, the radical remaining is

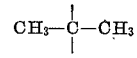

When X is halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical, X. The polyaryl polyalkylene polyisocyanates are preferably mixtures of di- and higher polyisocyanates. Thus, n in the formula preferably has a value of from about 0.1 to about 1.7. To illustrate, in a mixture of isocyanates of the above formula containing 90 percent diisocyanate and 10 percent triisocyanate, n would have a value of 0.1. For a mixture containing 20 percent di-, 30 percent tri-, 30 percent tetra- and 20 percent penta-isocyanate, the average value of n would be 1.7. A most preferred value for n is between about 0.85 and about 1.1 with about 40 percent to about 60 percent of the mixture of polyisocyanates being a diisocyanate.

Some specific examples of other isocyanates which may also be prepared in accordance with the process of the present invention by reaction of phosgene with the corresponding amine are, for example, alkyl, cycloalkyl, alkaryl, aralkyl, heterocyclic and aryl, mono-, di- and polyisocyanates such as, for example, hexyl isocyanate from hexylamine, octyl isocyanate from octylamine, dodecyl isocyanate from dodecylamine, octadecyl isocyanate from octadecylamine, tetramethylene diisocyanate from tetramethylenediamine, pentamethylene diisocyanate from pentamethylenediamine, hexamethylene diisocyanate from hexamethylenediamine, octamethylene diisocyanate from octamethylenediamine, undecamethylene diisocyanate from undecamethylenediamine, dodecamethylene diisocyanate from dodecamethylenediamine, 3,3'-diisocyanato dipropylether from 3,3'-diaminodipropylether, etc.; cyclohexyl isocyanate from cyclohexylamine, tetrahydro-a-naphthyl isocyanate from tetrahydro-a-naphthylamine, tetrahydro-b-naphthyl isocyanate from tetrahydro-b-naphthylamine, etc.; xylylene diisocyanate from xylylenediamines, diphenylmethane-4,4'-diisocyanate from 4,4'-diaminodiphenylmethane, b,b'-diphenylpropane-4,4'-diisocyanate from 4,4'-diamino-b,b'-diphenylpropane, etc.; benzyl isocyanate from benzylamine, phenylethyl isocyanate from phenylethylamine; p-isocyanato benzyl isocyanate from p-amino-benzylamine, etc.; phenyl isocyanate from aniline, o-chlorophenylisocyanate from o-chloroaniline, m-chlorophenyl isocyanate from m-chloroaniline, p-ethoxyphenyl isocyanate from p-ethoxyphenylamine, p-methoxyphenyl isocyanate from p-anisidine, u-cetyl phenyl isocyanate from p-cetylaniline; p-dodecylphenyl isocyanate from p-dodecylaniline, 5-dodecyl-2-methylphenyl isocyanate from 5-dodecyl-o-toluidine, 3-nitro-4-dodecyl phenylisocyanate from 3-nitro-4-dodecylaniline; p-cetyloxyphenyl isocyanate from p-cetyloxyaniline; m-phenylent diisocyanate from m-phenylene diamine, p-phenylene diisocyanate from p-phenylene diamine, 2,4-toluylene diisocyanate from 2,4-toluylene diamine, 2,6-toluylene diisocyanate from 2,6-toluylene diamine, isomeric mixtures of 2,4- and 2,6-toluylene diisocyanate from the corresponding mixtures of 2,4- and 2,6-toluylene diamine, 1,4-naphthalene diisocyanate from 1,4-naphthalene diamine, 1,3,5-benzene triisocyanate from 1,3,5-benzene triamine, 2,4,4'-triisocyanato diphenylether from 2,4,4'-triaminodiphenylether etc.; tetrahydrofurfuryl isocyanate from tetrahydrofurfurylamine, etc.

The isocyanates prepared are useful as intermediates in producing many valuable materials. For example, they may be reacted with organic compounds containing active hydrogen containing groups in the molecule such as, for example, hydroxyl polyesters and polyesteramides, polyhydric polyalkylene ethers and thioethers, polyacetals and the like to produce polyurethanes in the form of cellular or elastomeric products. The cellular products are useful as insulating materials, seat cushions, pillows and the like. The elastomeric materials are useful as automobile tires, valve buttons, diaphragms, gears, accumulator bladders, bellows and the like.

Although the invention has been described in considerable detail in the foregoing, it is to be understood that the purpose of such detail is solely to illustrate the embodiments of the invention and that modification can be made by those skilled in the art without departing from the spirit and scope of the invention except as set forth in the claims.

What is claimed is:

1. In an apparatus for the preparation of isocyanates by mixing phosgene with an amine in a mixing chamber and conducting the reaction in a reaction chamber, the improvement which comprises a first conduit having a first inlet, a second inlet and an outlet, said first conduit having a venturi section therein comprising a converging section, a throat section and a diverging section, said first inlet including a second conduit coaxially disposed within said first conduit and having a tapered section that concurs with the converging section of said venturi section and terminates in a dispersing means for dispersing fluid therefrom substantially perpendicular to the inner walls of the converging section of the venturi, said second inlet comprising a third conduit opening into said first conduit, the internal walls of the first conduit and the external surfaces of the second conduit having a mirror finish, said mixing chamber being defined by said converging section of said venturi section of said first conduit, and said reaction chamber being defined by that portion of said first conduit downstream of said throat section.

2. In an apparatus for the preparation of isocyanates by mixing phosgene with an amine in a mixing chamber and conducting the reaction in a reaction chamber, the improvement which comprises a first conduit having a first inlet, a second inlet and an outlet, said first conduit having a venturi section therein comprising a converging section, a throat section and a diverging section, said first inlet including a second conduit coaxially disposed within said first conduit and having a tapered section that concurs with the converging section of said venturi section and terminates in a point, said tapered section having a plurality of openings therein adapted to transversely disperse fluid therefrom into the surrounding chamber of the converging section of the venturi, said second inlet comprising a third conduit opening into said first conduit adjacent to and immediately preceding said converging section of said venturi section, the internal walls of the first conduit and the external surfaces of the second conduit having a mirror finish, said mixing chamber being defined by said converging section of said venturi section of said first conduit, and said reaction chamber being defined by that portion of said first conduit downstream of said throat section.

3. In an apparatus for the preparation of isocyanates by mixing phosgene with an amine in a mixing chamber and conducting the reaction in a reaction chamber, the improvement which comprises a first conduit having a first inlet, a second inlet and an outlet, said first conduit having a venturi section therein comprising a converging section, a throat section and a diverging section, said first inlet including a second conduit coaxially disposed within said first conduit and having a tapered section that concurs with the converging section of said venturi section and terminates in a point, said tapered section having at least three openings therein, said holes having a diameter of about $\frac{1}{16}$ of an inch and being disposed on a plane perpendicular to the length of the conduit, said openings being parallel with respect to a plane drawn through the center of said openings and at an angle with respect to said plane of from about 0° to about 45°, said second inlet comprising a third conduit opening into said first conduit adjacent to and immediately preceding said converging section of said venturi section, the internal walls of the first conduit and the external surfaces of the second conduit having a mirror finish, said mixing chamber being defined by said converging section of said venturi section of said first conduit, and said reaction chamber being defined by that portion of said first conduit downstream of said throat section.

4. In an apparatus for the preparation of isocyanates from phosgene and an amine, the improvement which comprises a first conduit having a mixing chamber and a reaction chamber, said first conduit having a first inlet, a second inlet, an outlet and a venturi section therein comprising a converging section, a throat section and a diverging section, said first inlet including a second conduit coaxially disposed within said first conduit and having a tapered section that concurs with the converging section of said venturi section, said tapered section ending in a concave mouth complemented by a convex base of a baffle having a substantially conical shape, the space between said mouth and said baffle being restricted to afford spraying dispersal of one reactant into another, said second inlet comprising a third conduit opening into said first conduit, the internal walls of the first conduit and the external surfaces of the second conduit having a mirror finish, said mixing chamber being defined by said converging section of said venturi section of said first conduit, and said reaction chamber being defined by that portion of said first conduit downstream of said throat section.

5. In an apparatus for the preparation of isocyanates from phosgene and an amine, the improvement which comprises a first conduit having a mixing chamber and a reaction chamber, said first conduit having a first inlet, a second inlet, an outlet and a venturi section therein comprising a converging section, a throat section and a diverging section, said first inlet including a second conduit coaxially disposed within said first conduit and having a tapered section that concurs with the converging section of said venturi section, said tapered section ending in a concave mouth complemented by a convex base of a baffle having a substantially conical shape, said baffle having a mirror finish over its entire surface and being secured to said conduit by means of a rod secured at one end to the center of the said baffle and threadably engaged in adjustable relationship to a spider at the other end, said spider being anchored to the inside surface of the conduit, the space between said mouth and said baffle being restricted to afford spraying dispersal of one reactant into another, said second inlet comprising a third conduit opening into said first conduit, the internal walls of the first conduit and the external surfaces of the second conduit having a mirror finish, said mixing chamber being defined by said converging section of said venturi section of said first conduit, and said reaction chamber being defined by that portion of said first conduit downstream of said throat section.

References Cited

UNITED STATES PATENTS

| 3,257,180 | 6/1966 | King | 48—180 |
| 3,226,410 | 12/1965 | Hettich et al. | 260—453 |
| 804,589 | 11/1905 | Enrico | 261—116 |

FOREIGN PATENTS

| 827,376 | 2/1960 | Great Britain. |
| 15,318 | 4/1912 | France. |
| 137,068 | 8/1952 | Sweden. |

JAMES H. TAUMAN, Jr., Primary Examiner

U.S. Cl. X.R.

22—258; 252—359; 259—2, 4; 260—453; 261—116